Oct. 6, 1959  B. L. HAVENS  2,907,526
ELECTRONIC ACCUMULATOR
Filed Nov. 2, 1956  9 Sheets-Sheet 1
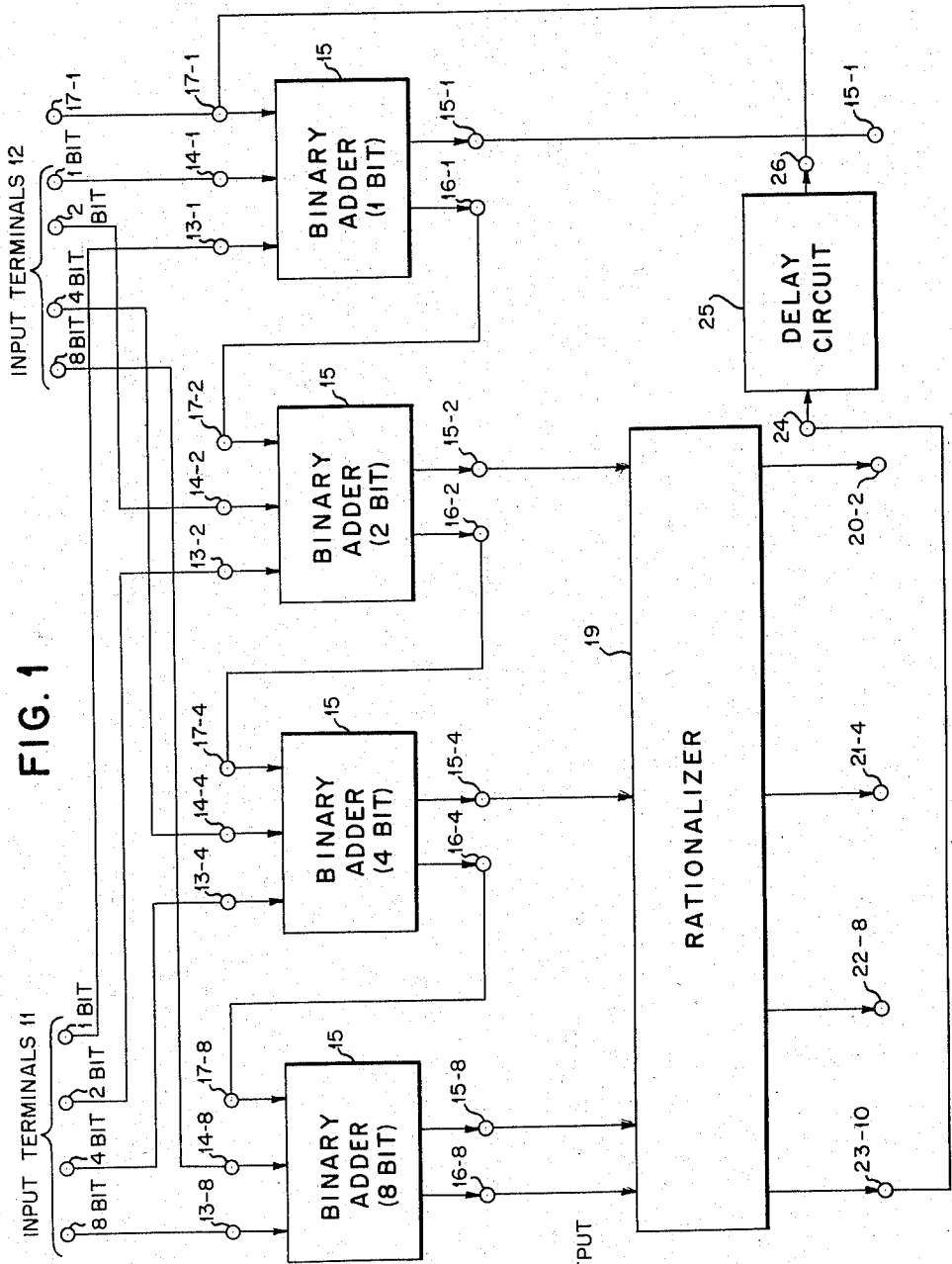
INVENTOR
BYRON L. HAVENS
BY
Dwight D. Mooney
ATTORNEY Oct. 6, 1959  B. L. HAVENS  2,907,526
ELECTRONIC ACCUMULATOR
Filed Nov. 2, 1956  9 Sheets-Sheet 2

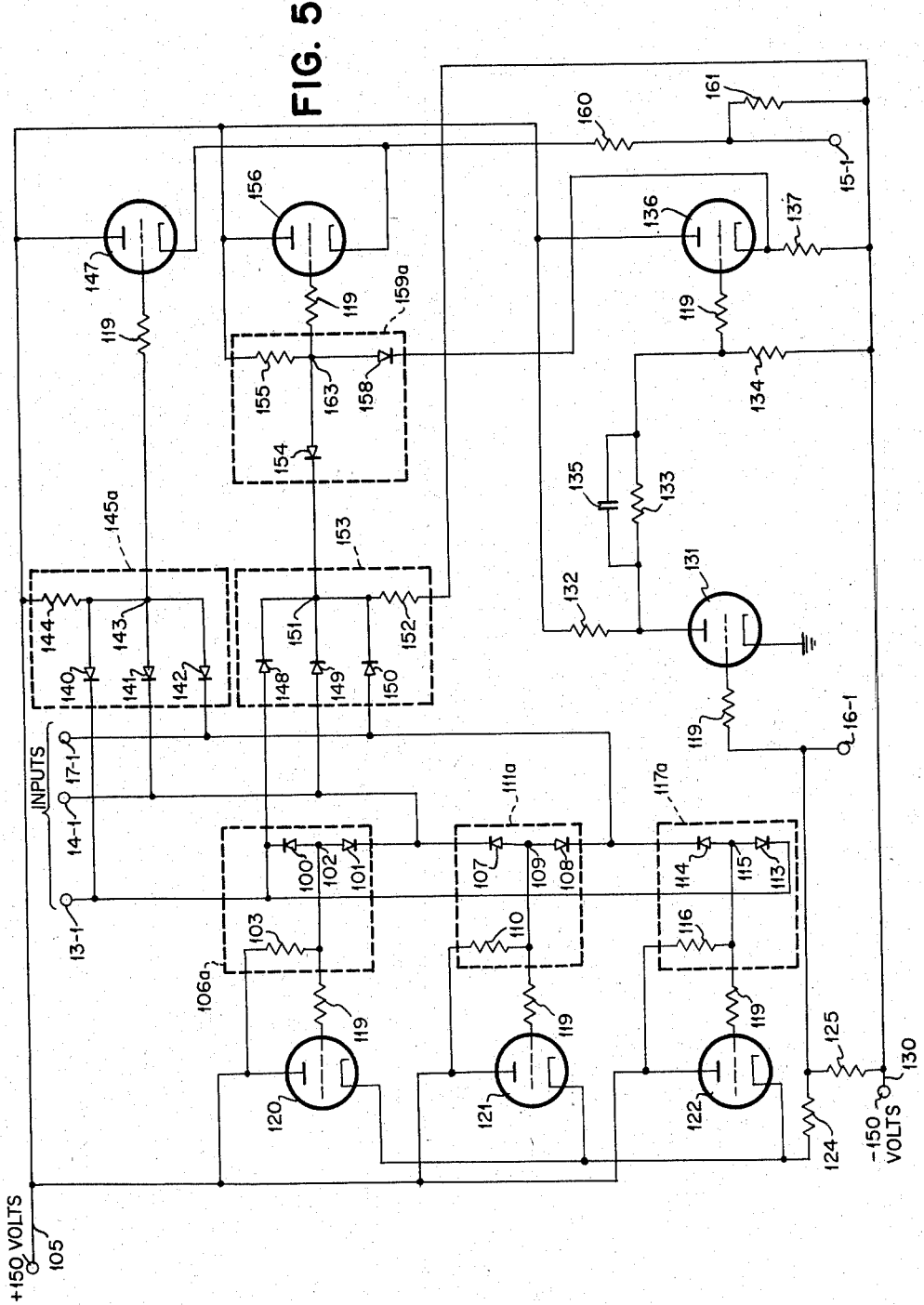

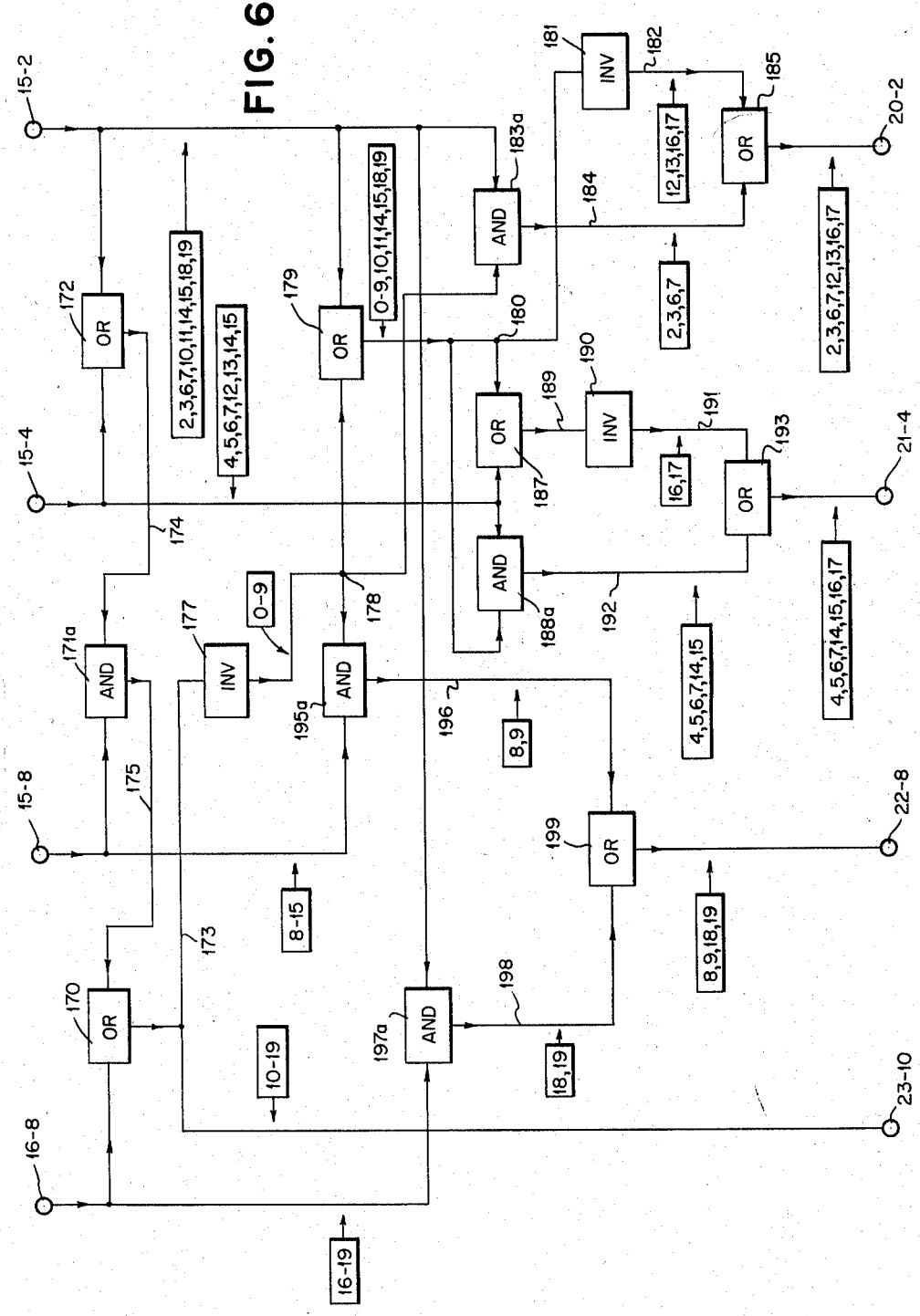

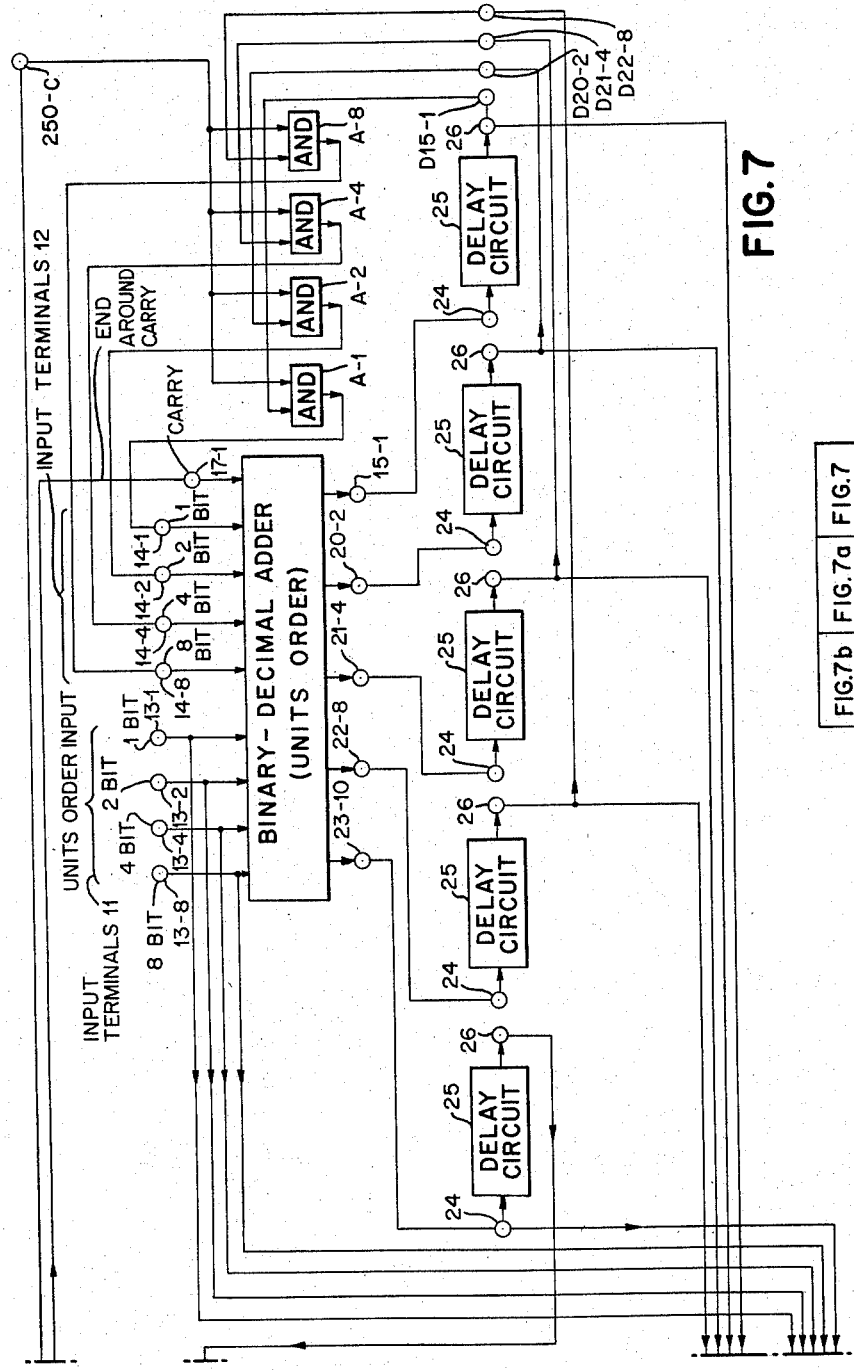

United States Patent Office 2,907,526
Patented Oct. 6, 1959

2,907,526

ELECTRONIC ACCUMULATOR

Byron L. Havens, Closter, N.J., assignor to International Business Machines Corporation, New York, N.Y., a corporation of New York Application November 2, 1956, Serial No. 620,073

11 Claims. (Cl. 235—174)

This invention relates to accumulators and more particularly to a parallel accumulator of the binary-decimal type.

The system of representing decimal numbers, digit for digit, in the pure binary notation is referred to herein as the binary-decimal system. The four consecutive binary orders, reading from right to left, represent the decimal digits 1, 2, 4 and 8 for the unit's decimal order and are accordingly referred to as the 1 bit, 2 bit, 4 bit and 8 bit respectively. It follows that each of the four binary orders of the ten's decimal order represent the decimal digits 10, 20, 40 and 80 respectively. Likewise, in subsequent decimal orders, for example; each of the four respective binary orders of the hundred's decimal order represent the decimal digits 100, 200, 400 and 800 respectively.

As an example, 459 will be represented in the binary-decimal system by 010001011001. The four binary bits at the right represent the decimal digit 9 of the unit's order, the next four bits to the left represent the decimal digit 5 of the ten's order, and the four bits at the extreme left represent the decimal digit 4 of the hundred's order.

Any decimal number from 0-15 inclusive can be represented by a group of four binary bits. If the decimal number is 16, then a binary carry occurs to the next group of binary bits to be added to the next decimal order. However, in the binary-decimal system, only the decimal digits (0-9 inclusive) are represented by each group of four binary bits. The addition of two decimal digits or a decimal column of the decimal numbers to be added may provide at most a sum of 18 plus a carry. The actual decimal sum is, therefore, between 0-19 inclusive. As stated, if this addition is performed in the pure binary notation and the sum is 16 or more, a carry is provided and in any case if the sum is over 9 (1001), it is not expressed in the binary-decimal system by mere binary addition. It follows that the sum, in the binary-decimal system of two decimal numbers expressed in the binary-decimal system, may be obtained by adding the two numbers in the pure binary notation and providing circuit means responsive to a sum greater than 9 (1001) to express the sum resulting from the pure binary addition in the binary-decimal system.

Adders for deriving the sum of decimal numbers expressed in the binary-decimal system by pure binary addition and then converting that sum to the binary-decimal system are of two principal types. The adder is a serial type adder if the binary bits representing each decimal digit to be added are received in succession. The adder is a parallel type adder if the binary bits representing each decimal digit to be added are received simultaneously.

A principal object of the invention is to provide a novel parallel accumulator of the binary-decimal type.

Another object is to provide an accumulator of the binary-decimal type which does not employ any static storage elements.

Another object is to provide a novel parallel accumulator of the binary-decimal type wherein each order of the accumulator employs a binary-decimal adder having output terminals connected through delay circuits to input terminals of that binary-decimal adder for effecting a continuous circulation through the adder of values stored in that order of the accumulator.

A further object is to provide a parallel accumulator of the binary-decimal type employing novel means for detecting the presence of an input and a carry and exhibiting the accumulator output during the time interval immediately after which a carry or an input is last present.

A still further object is to provide an accumulator having novel means for clearing stored values therefrom or resetting the accumulator to its initial condition.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a block diagram of a binary-decimal adder suitable for use in the invention;

Fig. 3 is a circuit diagram of an And circuit typical of the type employed by the invention;

Fig. 4 is a circuit diagram of an Or circuit typical of the type employed by the invention;

Fig. 5 is a circuit diagram of a binary adder which may be employed in the binary-decimal adder of Fig. 1;

Fig. 6 is a logical diagram of an embodiment of the rationalizer shown in Fig. 1;

Figs. 7, 7a, 7b and 7c arranged as indicated in Fig. 7d comprise the complete diagram of the accumulator of the invention.

Figure 2A:
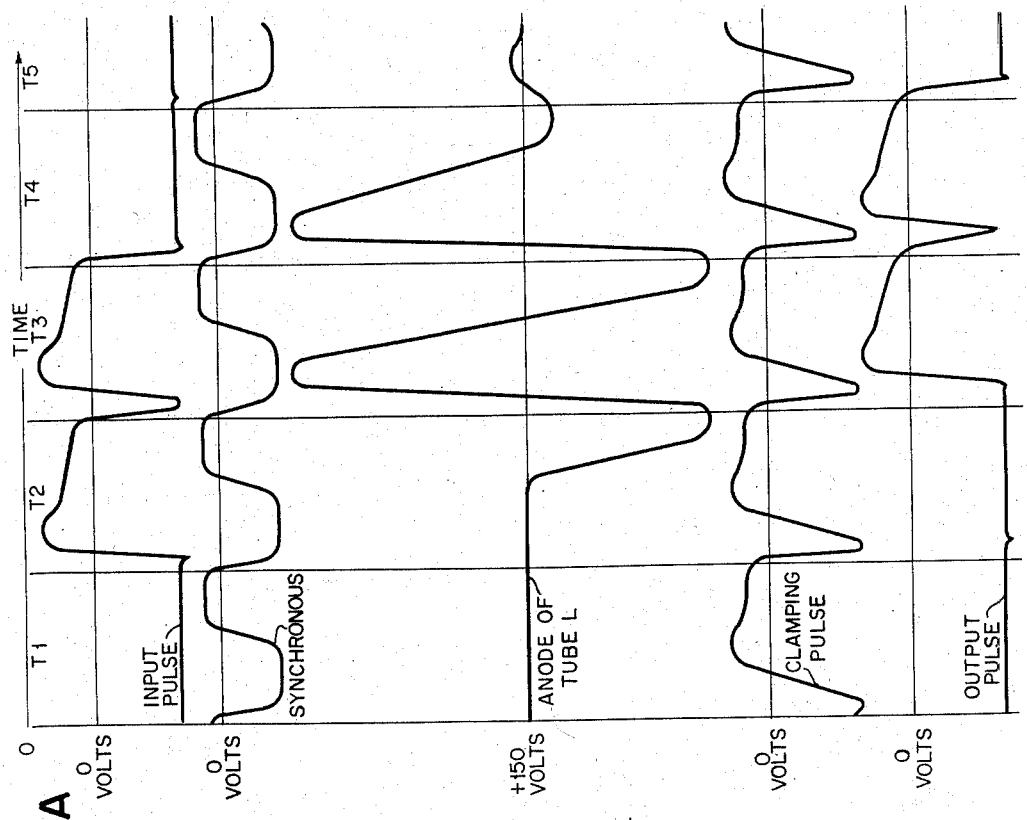
Fig. 2a shows wave forms illustrating the operation of the circuit of Fig. 2.

Briefly, the binary-decimal adder employed by the invention effects addition of decimal numbers expressed in the binary-decimal system and is claimed in the application of Byron L. Havens and Charles R. Borders, Serial No. 338,122, filed February 20, 1953, and entitled "Serial-Parallel Binary-Decimal Adder."

In the binary-decimal adder, two decimal numbers are added column by column in time sequence. The binary bits representing each of the two decimal digits of the same decimal column or order are applied simultaneously to the adder. Each binary bit is applied to a separate input terminal. Four binary adders are provided to effect binary addition of corresponding or like binary bits of a decimal digit; i.e., one adder is provided for the 1 bits, one for the 2 bits, one for the 4 bits and one for the 8 bits. Each adder has a separate input terminal to receive each of the two bits to be added and a third or carry input terminal. Also, each adder has an output terminal at which appears the sum of the two binary bits added and a second or carry output terminal. The carry output terminal of each adder, except that for the 8 bits, or highest bit adder of each order, is connected to the carry input terminal of the adder corresponding to the next higher numbered bit or binary order.

The output terminal of the binary adders for the 2, 4, and 8 bits and the carry output of the 8 bit adder provide the inputs to a rationalizer which, with the output of the 1 bit adder, provides a sum of the two digits of the decimal column in the binary-decimal system. If the sum of any decimal column is over 9; i.e., between 10-19, inclusive, the outputs from the binary adders will not be in the binary-decimal system. If such is the case, it will be indicated by the presence of carry at the output of the 8 bit adder, or by the presence of an output at the 8 bit adder plus an output at the 4 bit adder or the 2 adder. The rationalizer includes coincidence and pulse transfer circuits responsive to the existence of either of the above conditions to effect the necessary correction to provide a sum in the binary-decimal system. The output terminal of the 1 bit adder and the output terminals of the rationalizer representing the decimal digits 2, 4, 8 and 10 provide the output in the binary-decimal system. The 10 output represents the first binary order or bit of the next higher decimal order and is therefore referred to as a carry or 10 bit. This carry output or 10 bit terminal is is connected through an appropriate delay circuit to the carry input terminal of the 10 bit adder to effect carry to the next decimal column. The delay provided by this delay circuit is equal to the time elapsing between the successive inputs to the accumulator.

A binary-decimal adder is employed for each order of the accumulator of the invention. Binary bits representing the decimal digit to be added into each order of the accumulator are applied to one group of input terminals, e.g., input terminals provided for the 1 bit, 2 bit, 4 bit and 8 bit of the unit's order adder.

The output or value stored in each order of the accumulator at any given time interval is applied to a second group of four input terminals thereof during the next succeeding time interval which is concurrent with receipt of the next value to be stored at the other four input terminals. The binary-decimal adder then adds these two values to obtain a new sum in binary decimal form. This new sum is then applied through delay circuits and in like manner the process is repeated. If an input is not applied to the accumulator, the value stored therein continues to circulate through the binary decimal adder and the delay circuit until the accumulator is cleared or returned to its zero condition. Hence, the binary-decimal adder, one group of input terminals and the output terminals, except the carry output terminal, and the delay circuits connected between the input and output terminals comprise a circulatory storage circuit from which the value stored in the accumulator is available at any given time interval.

A two input And circuit is also connected between each of the above delay circuits and the corresponding bit input terminal of each storage circuit to provide for clearing or resetting of the accumulator to the zero or its initial starting condition. The other input terminal of all these And circuits is commonly connected and a preselected voltage is applied thereto to interrupt the storage circuit and thereby eliminate therefrom the value stored to return the accumulator to its zero or initial starting condition.

The carry output terminal of each order of the accumulator is connected through a delay circuit to the carry input terminal of the adder of the next higher order, except that for the highest order. The carry output terminal of the highest order is connected through a delay circuit to the carry input terminal of the 1 bit adder of the unit's order of the accumulator to provide for end-around carry to effect subtraction in response to the entry of the nine's complement of the value or amount to be subtracted. This connection serves no purpose when the accumulator is used to effect addition.

The four input terminals which receive inputs for each order of the accumulator and the carry output terminal of each order of the accumulator are connected to an Or circuit which provides a positive output when an input or carry is present. When no carry or input is present, the output of this Or circuit is negative. This negative output is applied to an electronic inverter which produces a positive output in response thereto. This positive output is applied to a lead connecting one input terminal of each of a plurality of two input And circuits. The other input terminal of each of these And circuits is coupled to a different one of the input terminals included in the storage circuit. Hence, the value or bits stored are always exhibited at one input of the corresponding And circuit. When no input or carry is present, the other input to the And circuits is positive and the value stored in the accumulator is indicated by the outputs of the And circuits.

Referring more particularly to Fig. 1, the binary-decimal adder includes input terminals generally designated as 11 and 12 and each comprises four terminals designated as 11 and 12 and each comprises four terminals designated as 1 bit, 2 bit, 4 bit and 8 bit respectively. The respective binary bits representing one decimal digit to be added are applied to the correspondingly designated terminal of the input terminals 11 and the respective binary bits representing the other decimal digit to be added are applied to the correspondingly designated terminal of the input terminals 12. All of these bits are applied simultaneously. For example, suppose that the decimal digits 5 and 6 occur in the same decimal column and are to be added and further that the 5 (0101) is to be applied to the input terminals 11 and the 6 (0110) is to be applied to the input terminals 12, it follows that pulses will be simultaneously applied to the 1 bit and 4 bit terminals of the input terminals 11 and to the 2 bit and 4 bit terminals of the input terminals 12.

The 1 bit terminals of 11 and 12 respectively are connected to the input terminals 13–1 and 14–1 of the 1 bit adder 15 having an output terminal 15–1 and a carry output terminal 16–1 connected to the carry input terminal 17–2 of the 2 bit adder. Similarly, the 2 bit input terminals of 11 and 12 are respectively connected to the input terminals 13–2 and 14–2 of the 2 bit adder 15 and the carry output terminal 16–2 of the 2 bit adder is connected to the carry input terminal 17–4 of the 4 bit adder. The 4 bit adder is similarly connected to the 4 bit input terminals and to the carry input terminal 17–8 of the 8 bit adder. Each of the binary adders effects pure binary addition of the inputs applied to its three input terminals.

The output terminals 15–2, 15–4 and 15–8 of the 2 bit, 4 bit and 8 bit adders respectively and the terminal 16–8 of the 8 bit adder supply the inputs to the rationalizer 19. These inputs activate the various interconnected coincidence circuits of the rationalizer so that the output at the terminal 15–1 of the 1 bit adder and the output terminals 20–2, 21–4, 22–8 and 23–10 of the rationalizer 19 comprise a binary-decimal output, the particular output at any one of these terminals representing the value of the designated decimal suffix thereof. Hence, if the terminal 23–10 is Up or positive, it indicates the presence of the decimal digit 10 or the first binary bit of the next or ten's decimal order to be added. This carry terminal 23–10 is therefore connected to the input terminal 24 of a delay circuit 25 whose output terminal 26 is connected to the carry input terminal 17–1 of the 1 bit adder to provide a carry pulse into the next decimal column to be added. This carry pulse or 10 bit is applied to the terminal 17–1 simultaneously with the application of inputs to the terminals 11 and 12 for the next decimal digits or column to be added.

As used in the accumulator of the invention, however, the delay circuit 25 is not connected between the terminals 23–10 and 17–1. As stated above, the carry output terminal of each binary-decimal adder is connected to the carry input terminal of the lowest bit adder for the next higher order, e.g.; the carry output terminal 23–10 of the units order is connected through a delay circuit to the carry input terminal 17–10 of the 10 bit adder of the tens order and carry output terminal 23–100 of the tens order is connected through a delay circuit to the carry input terminal 17–100 of the hundreds order.

Various circuits used herein or particular points within the circuits are frequently referred to as being Up or Down. Up means that the voltage present at the particular point or at the output of the circuit designated is positive with respect to ground. Down means that the voltage present at the particular point or at the output of the circuit designated is negative with respect to ground. If the control grid of a vacuum tube is referred to as Down, it means that the voltage at that control grid is below the cutoff value for the vacuum tube.

Numerous coincidence circuits are employed herein. An And circuit refers to a circuit which is operable to produce a positive voltage at its output terminal only when all of the input terminals thereof have a positive voltage applied thereto simultaneously. An Or circuit refers to a circuit operable to produce a positive voltage at its output terminal when only one or a plurality of the input terminals thereof has a positive voltage applied thereto.

The invention utilizes numerous dual-type tubes having two tube sections in a single envelope. Each such section is referred to herein as a tube and designated by a number followed by the letter L or R or simply by the letters L and R to indicate the left-hand or right-hand tube section, respectively. A tube so referred to is similarly designated thereafter if employed with the same circuitry and for the same purpose even though it is not shown with its corresponding L or R tube.

Figure 2:
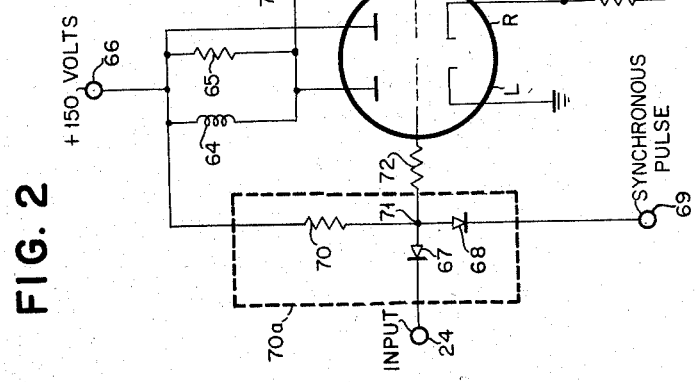
Fig. 2 is a circuit diagram of a delay circuit suitable for use in the invention.

Referring more particularly to Figs. 2 and 2a, the delay circuit 25 of the type actually employed in Fig. 1 will be described. This circuit is claimed in U.S. Patent No. Re. 23,699, issued August 18, 1953, to Byron L. Havens based upon original Patent No. 2,624,839, issued January 6, 1953, on an application filed July 30, 1951. The curves of Fig. 2a demonstrate the operation of the circuit shown in Fig. 2. In order to facilitate the description, the time axis (abscissa) is divided into equal time intervals designated T1, T2, T3, T4 and T5, respectively. The length of each of these time intervals is dependent upon the particular circuit design and as used herein is equal to the time elapsing between the initiation of the addition of one decimal column and the initiation of the addition of the next decimal column to be added. As shown, each time interval is of approximately one microsecond duration.

Briefly, an input pulse (Fig. 2a) is applied to the input terminal 24 of the circuit shown in Fig. 2 during one preselected time interval and produces an output pulse (Fig. 2a) at the output terminal 26 during the next subsequent time interval. An input pulse may be applied to the input terminal 24 during the same time interval, T3 for example, that an output pulse is produced at the output terminal 26. The flyback produced by an input pulse is used to set up the output pulse and the circuitry is such that there is complete electrical isolation between the output and input pulse during any given time interval.

A clamping pulse (Fig. 2a) is applied to the terminal 62 to wipe out or remove the information stored after that information has been utilized.

The anode of tube L is connected through inductance 64 and an anode load resistor 65, in parallel, to a +150 volt terminal 66. The inductance 64 is provided to permit the voltage at the anode of the tube L to go more positive than +150 volts (Fig. 2a during T3 and T4) for a preselected time immediately after that tube is rendered non-conductive.

The diode rectifiers 67 and 68 connected respectively to input terminal 24 and terminal 69, and the resistor 70 connected between the juncture 71 of the diodes 67 and 68 and the +150 volt terminal 66 comprise an And circuit generally designated as 70a. This juncture 71 is connected through a parasitic suppressor resistor 72 to the control grid of the tube L.

The tube R is operated as a cathode follower and is always conductive during operation of the delay circuit. The cathode load resistor 73 is connected to a —82 volt terminal 74 which is also connected through a resistor 75 and a condenser 76 to the anode of the tube L. The terminal 62 is connected through a resistor 77 and diode rectifiers 78, 79 and 80, in series, to a —30 volt terminal 81. The juncture 82 is connected between the rectifiers 79 and 80 and between the resistor 75 and condenser 76. The juncture 83 joining rectifiers 78 and 79 is connected through a parasitic suppressor resistor 84 to the control grid of the tube R and through a condenser 85 to ground.

During the time interval T1, an input pulse is not applied to the input terminal 24 and juncture 71 is therefore down so that a positive voltage is not applied to the control grid of the tube L. During this time interval the tube L is non-conductive, tube R is conductive, and output terminal 26 is down. The voltage at the anode of tube L is +150 volts and the condenser 76 is charged and approximately 180 volts appears across it, the left plate is at +150 volts and the right plate is at —30 volts. The juncture 82 cannot be more negative than the —30 volt terminal 81 because when such is attempted the rectifier 80 conducts and pulls the voltage at juncture 82 up to that of the terminal 81. It is the conduction of rectifier 80 during the time interval T1 that keeps juncture 82 at approximately —30 volts. The resistor 75 tends to prevent the voltage at juncture 82 from drifting between the application of successive clamping pulses. The juncture 83 is also at —30 volts and condenser 85 is charged with —30 volts at its upper plate and its lower plate is at zero volts (ground). Rectifier 79 conducts when condenser 85 is being charged and when the clamping pulse (Fig. 2a) applied to the terminal 62 attempts to pull the juncture 83 below —30 volts, the voltage at the terminal 81. Hence, when the clamping pulse is most negative, the voltage at the control grid of the tube R has been pulled down, and since tube R is a cathode follower, the voltage at the output terminal 26 is also pulled down.

This action effects the wiping out of the information stored after that information has been used. In other words, the output pulse produced is brought to an end as shown at the beginning of time intervals T4 and T5 (Fig. 2a). When the clamping pulse thus goes negative, the rectifier 78 is rendered conductive.

During the latter portion of time interval T2, the input pulse and synchronous pulse are both positive simultaneously. The juncture 71 is therefore Up and the tube L becomes heavily conductive and the voltage at its anode decreases rapidly (Fig. 2a). The condenser 76 discharges through the tube L and the resulting tendency of juncture 82 to assume the voltage at the anode of the tube L is arrested by the conduction of rectifier 80 and the voltage at this juncture remains —30 volts.

Just at the start of time interval T3, both the input pulse and synchronous pulse go negative and the voltage at the juncture 71 and control grid of tube L accordingly go Down and tube L is rendered non-conductive. As a result, the voltage at the anode of the tube L increases rapidly and actually exceeds +150 volts because critical clamping of this anode circuit is not effected by the inductance 64 and resistor 65. It is this increased voltage or flyback which initiates the output pulse. This voltage is transferred through condenser 76 to cause the voltage at juncture 82 to go Up (to approximately 5 volts) from —30 volts. The rectifier 79 then conducts to cause the juncture 83 and control grid of tube R to go Up and the upper plate of condenser 85 is charged positive relative to its lower or grounded plate. The voltage at the output terminal 26 connected to the cathode of the tube R follows the control grid and goes Up to initiate the output pulse during the time interval T3.

As the voltage at the anode of the tube L decreases toward +150 volts, the voltage at juncture 82 similarly decreases. During the latter portion of time interval T3, the voltage at the juncture 82 is again approximately —30 volts. Both the terminals 24 and 69 again go positive as shown by the second input pulse and synchronous pulse which occur during the latter part of time interval T3 while the output terminal 26 is still Up.

As a result, the tube L again becomes heavily conductive and the voltage at its anode decreases and the juncture 82 again remains at −30 volts because of the conduction through rectifier 80.

When the clamping pulse goes negative at the start of time interval T4, conduction through rectifiers 78, 79 and 80 results and juncture 83 as well as juncture 82 is placed at approximately −30 volts. The control grid of tube R and output terminal 26 therefore go Down and the output pulse, occurring during time interval T3 and produced in response to the input pulse applied during time interval T2, is terminated.

When the juncture 71 goes Down at the start of time interval T4, the tube L becomes non-conductive and its anode voltage starts to increase rapidly as described hereinbefore.

This increased voltage causes the juncture 82 to go Up, the juncture 83 to go Up and the output terminal 26 to go Up as indicated by the output pulse occurring during time interval T4. The voltage at the anode of the tube L finally assumes, during the time interval T5, a steady value of +150 volts. If an input pulse was applied during the time interval T4, the voltage at the anode of tube L would never reach a steady value of +150 volts. Such is indicated by this anode voltage during the time interval T3.

Just prior to the anode of tube L reaching a steady voltage value, the clamping pulse goes negative (time interval T5). At this time the juncture 82 has again assumed a voltage value of −30 volts but the juncture 83 is still Up. When the clamping pulse causes the terminal 62 to go negative, the rectifiers 78, 79 and 80 are rendered conductive and the voltage at the juncture 83 goes Down to terminate the output pulse at the beginning of time interval T5.

It is now clear that the use of flyback makes possible the production of an output pulse in one preselected time interval in response to an input pulse received during the next prior time interval and that rectifier circuitry and a clamping pulse are employed to effect complete isolation between input and output circuits simultaneously operable.

It is understood that any suitable delay circuits may be employed by the invention and that the various voltage values are given merely to facilitate the description and understanding of the circuit operation. Also, the particular values of the circuit components used will vary in accordance with the particular operation the delay circuit is required to perform.

Fig. 3 shows an And circuit typical of the type employed by the invention. The resistor R connected between the juncture J and the source of positive voltage B+ tends to pull the juncture J up to the positive voltage value B+. The plates of the diode rectifiers 95 and 96 are connected to juncture J and the cathodes of these rectifiers are connected to the respective input terminals. Hence, the voltage at J can be no higher than the lower of the two voltages at the input terminals. The voltage at J will change only if the increased voltage is present at the more negative of the two input terminals. In such case, the voltage at J will rise until it reaches this increased voltage value. It is seen, therefore, that when both of the input terminals are Up, J and consequently the output terminal connected thereto is Up. Obviously, additional diodes may be connected between corresponding input terminals and the juncture will be Up only when all input terminals are Up.

Fig. 4 shows an Or circuit using diode rectifiers 97 and 98. The resistor R1 connected between the juncture J1 and a source of negative voltage B− tends to pull down the voltage at J1 to a value equal to that of B−. The cathodes of the diodes are connected to juncture J1 and the plates of these diodes are connected to respective input terminals. Hence, the voltage at J1 can be no lower than the higher of the voltages at the input terminals. The voltage at J1 increases in accordance with the more positive voltage at the input terminals. Hence, when either of the input terminals is Up, the terminal J1 and consequently the output terminal connected thereto is Up. Obviously, additional diodes may be connected between corresponding input terminals and the juncture J1 and the juncture will be Up when any one or more of the input terminals is Up.

Referring more particularly to Fig. 5, the circuit shown effects addition in true binary fashion and is therefore termed a binary adder. As stated, the presence of a pulse at one of the input terminals 13–1, 14–1 and 17–1 (Figs. 1 and 5) indicates the presence of binary 1 and the absence of a pulse thereat indicates a binary 0. Hence, to effect addition in true binary fashion, the output terminal 15–1 must exhibit a binary 0 when no input pulse is applied to the input terminals 13–1, 14–1 and 17–1, a binary 1 when an input pulse is applied to one input terminal, a binary 0 and a binary 1 carry when pulses are applied to two input terminals, and a binary 1 and a binary 1 carry when pulses are applied to all three input terminals. These functions are performed by the circuitry shown.

Diode rectifiers 100 and 101 have their cathodes connected to the input terminals 13–1 and 14–1 respectively and their plates commonly connected at juncture 102 which is connected through a pull up resistor 103 to the +150 volt line 105. The rectifiers 100 and 101 and the resistor 103 comprise an And circuit 106a. When the input terminals 13–1 and 14–1 are Up the juncture 102 is Up. Similarly, the diode rectifiers 107 and 108 are connected between the input terminals 14–1 and 17–1 and the common juncture 109 is connected through pull up resistor 110 to the +150 volt line 105. The diode rectifiers 107 and 108 and the pull up resistor 110 comprise an And circuit designated as 111a.

The diode rectifiers 113 and 114 are connected between the input terminals 13–1 and 17–1 and their common juncture 115 is connected through pull up resistor 116 to the +150 volt line 105. The rectifiers 113 and 114 and pull up resistor 116 comprise an And circuit 117a. The respective junctures 102, 109 and 115 are connected through the parasitic suppressor resistors 119 to the control grid of the tubes 120, 121 and 122 respectively. The plate of each of these tubes is connected to the +150 volt line 105 and their cathodes are commonly connected through a dropping resistor 124 and a load resistor 125 to the −150 volt line 30. The resistor 125 is a common load resistor for each of the cathode follower tubes 120, 121 and 122 and the dropping resistor 124 is provided to compensate for the cathode follower bias and thereby keep the cathodes of those tubes at approximately the same voltage as their control grids. Since the cathodes of the tubes 120, 121 and 122 are commonly connected, the carry output terminal 16–1 is Up when one or more of the cathodes of the tube 120, 121 and 122 are Up. These tubes 120, 121 and 122 therefore comprise a cathode follower type Or circuit. If any two of the input terminals 13–1, 14–1 and 17–1 are Up, the corresponding And circuit is rendered effective to cause the carry output terminal 16–1 to go Up. For example, if the input terminals 13–1 and 14–1 go Up, the juncture 102 of And circuit 106a goes Up, the control grid of tube 120 connected thereto goes Up, the cathode of tube 120 goes Up and the carry output terminal 16–1 goes Up. Also, if all three of the input terminals 13–1, 14–1 and 17–1 go Up, the junctures 102, 109 and 115 of And circuits 106a, 111a and 117a, respectively, all go Up. The control grids of cathode follower tubes 120, 121 and 122 all go Up and carry output terminal 16–1 goes Up. Hence, if an input is present at two or three of the input terminals 13–1, 14–1 and 17–1, a carry output is provided. This complies with the rules of binary addition.

The carry output terminal 16–1 is also connected through a parasitic suppressor resistor 119 to the control grid of inverter tube 131 having a grounded cathode and its plate connected through load resistor 132 to the +150 volt line 105. The plate of inverter tube 131 is also connected through a voltage divider comprising resistors 133 and 134 to the −150 volt line 130. A frequency compensating condenser 135 is connected, in parallel, with the resistor 133 and the juncture of resistors 133 and 134 is connected through a parasitic suppressor resistor 119 to the control grid of the cathode follower tube 136 having its cathode connected through a load resistor 137 to the −150 line 130 and its plate connected to the +150 volt line 105. The control grid of the inverter tube 131 is connected to the carry output terminal 16–1 and is therefore Up when two or three of the input terminals 13–1, 14–1 and 17–1 are Up. It follows that the plate of the inverter tube 131 is Up when one of the input terminals 13–1, 14–1 and 17–1 is Up and when none of those terminals in Up. The cathode of the cathode follower tube 136 follows its grid and is therefore Up when one input is present or when no input is present.

The cathodes of diode rectifiers 140, 141 and 142 are connected to the input terminals 13–1, 14–1 and 17–1 respectively and their plates connected to a common juncture 143 which is connected through a pull up resistor 144 to the +150 volt line 105. Rectifiers 140, 141 and 142 and pull up resistor 144 comprise an And circuit 145a. The juncture 143 of And circuit 145a is connected through parasitic suppressor resistor 119 to the control grid of the cathode follower tube 147 having its plate connected to the +150 volt line 105.

The diode rectifiers 148, 149 and 150 have their plates connected to the input terminals 13–1, 14–1 and 17–1 respectively and their cathodes connected to a common juncture 151 which is connected through a pull down resistor 152 to the −150 volt line 130. The rectifiers 148, 149 and 150 and resistor 152 comprise an Or circuit 153. The juncture 151 or the output of Or circuit 153 is connected to the plate of diode 154 having its cathode connected through pull up resistor 155 to the +150 volt line 105 and through parasitic suppressor resistor 119 to the control grid of cathode follower tube 156.

Diode rectifier 158 has its plate connected to the plate of rectifier 154 and its cathode connected to the cathode of cathode follower 136. Diode rectifiers 154 and 158 and pull up resistor 155 comprise an And circuit 159a.

The cathodes of cathode follower tubes 147 and 156 are commonly connected through a dropping resistor 160 and a load resistor 161 to the −150 volt line 130. The juncture at resistors 160 and 161 is connected to output terminal 15–1.

The juncture 143 of And circuit 145a is Up only when all three of the input terminals 13–1, 14–1 and 17–1 are Up, i.e., only when three inputs are applied. As a result, the control grid of cathode follower tube 147 goes Up and its cathode follows to cause the output terminal 15–1 to go Up when three inputs are present. The juncture 151 of Or circuit 153 goes Up when one or more of input terminals 13–1, 14–1 and 17–1 goes Up. The cathode of cathode follower tube 136 goes Up when one input or no input is present. Hence, the juncture 163 of And circuit 159a goes Up only when one of the input terminals 13–1, 14–1 and 17–1 is Up. When the juncture 163 of And circuit 159a goes Up, the grid and cathode of cathode follower tube 156 go Up and the output terminal 15–1 goes Up. Hence, output terminal 15–1 goes Up when one or three inputs are applied to the input terminals 13–1, 14–1 and 17–1.

The circuit of Fig. 5 therefore provides an output sum and carry strictly in accordance with the rules of binary addition. Also, as shown hereinbefore, a carry output is provided at terminal 16–1 when two or three binary 1's are added and when a single binary 1 is present.

While the terminal designations include a suffix 1 to indicate that the particular adder is the 1 bit adder, it is understood that the 2, 4 and 8 bit adders of Fig. 1 are similar, the only difference being in the suffix designation.

The logical or block diagram of the rationalizer shown in Fig. 6 will be described in connection with Table I below.

*Table I*

| Decimal Number | Corresponding Designation in Pure Binary Notation | Corresponding Designation in Binary-Decimal System |
|---|---|---|
| 0 | 0000 | 0000 |
| 1 | 0001 | 0001 |
| 2 | 0010 | 0010 |
| 3 | 0011 | 0011 |
| 4 | 0100 | 0100 |
| 5 | 0101 | 0101 |
| 6 | 0110 | 0110 |
| 7 | 0111 | 0111 |
| 8 | 1000 | 1000 |
| 9 | 1001 | 1001 |
| 10 | 1010 | 10000 |
| 11 | 1011 | 10001 |
| 12 | 1100 | 10010 |
| 13 | 1101 | 10011 |
| 14 | 1110 | 10100 |
| 15 | 1111 | 10101 |
| 16 | 10000 | 10110 |
| 17 | 10001 | 10111 |
| 18 | 10010 | 11000 |
| 19 | 10011 | 11001 |

The input terminals 15–2, 15–4, 15–8 and 16–8 correspond to similarly numbered terminals of Fig. 1. The middle column of Table I represents in the binary notation the corresponding or oppositely placed decimal number of the left-hand column and the extreme right-hand column designates the corresponding decimal numbers in the binary-decimal system. In the middle column the second binary column from the right represents the input to the terminal 15–2, the third column, the input to the terminal 15–4, the fourth column, the input to the terminal 15–8 and the fifth column, the input to the terminal 16–8. In the right-hand column of Table I, the second binary column from the right indicates the output at the terminal 20–2, the third binary column, the output from the terminal 21–4, the fourth binary column, the output from the terminal 22–8 and the fifth, the output from the terminal 23–10. The output from the terminal 15–1 (Fig. 1) is represented by the right-hand binary column or order of the middle and right-hand columns of Table I.

As stated hereinbefore, the sum derived from the addition of any decimal column must lie between 0–19 inclusive. This sum is derived by the binary bit adders of Fig. 1 and appears at the output terminals of the adders in the binary notation as shown by the middle column of Table I. The rationalizer converts this sum to the binary-decimal system as indicated by the right-hand column of Table I if such conversion is required, i.e., if the sum is over 9 (1001).

By referring to the middle of Table I, it can be seen by inspection of the second binary column from the right that the terminal 15–2 is Up when the decimal sum is either 2, 3, 6, 7, 10, 11, 14, 15, 18 or 19. From the third binary column, it is seen that the input terminal 15–4 is Up when the decimal sum is either 4, 5, 6, 7, 12, 13, 14 or 15. From the fourth binary column, it is seen that the terminal 15–8 is Up when the sum is between 8–15 inclusive, and from the fifth decimal column, it is seen that the terminal 16–8 is Up when the sum is between 16–19 inclusive; these terminals are Down when any sum other than that indicated is present.

In Fig. 6 the decimal sums which cause certain leads and terminals to be Up are indicated by the numerals which are enclosed in a rectangle and directed by an arrow toward the lead or terminal to which they apply.

In Fig. 6 the Or circuit 170, And circuit 171a and Or circuit 172 are provided to detect sums greater than 9 (1001). All such numbers are indicated by the terminal 16–8 being in the Up condition or the terminal 15–8 being in the Up condition simultaneously with the terminal 15–4 or 15–2 being in the Up condition.

If either of these two conditions is present, the lead 173 connected to the output terminal 23–10 is Up and a carry or 10 bit is present. If the terminal 16–8 is Up, the Or circuit 170 causes lead 173 to go Up. Or circuit 172 is connected between terminals 15–2 and 15–4. Hence, its output lead 174 connected to an input of And circuit 171a is Up if either of those terminals is Up. The other input of And circuit 171a is connected to terminal 15–8. Hence, if the terminal 15–8 and terminal 15–4 or the terminal 15–8 and the terminal 15–2 are Up, the output lead 175 of And circuit 171a is Up. Lead 175 provides one input to the Or circuit 170. Hence, when lead 175 is Up, Or circuit 170 functions to cause lead 173 to go Up. Hence, if a 16 (10000) or an 8 (1000) plus a 4 (0100) or a 2 (0010) are present, the terminal 23–10 is Up to provide a carry pulse or a 10 bit.

Lead 173 supplies the input to inverter (INV) 177. The juncture 178 connected to receive the output of inverter 177 is therefore Up if the sum is between 0–9 inclusive. The juncture 178 and the input terminal 15–2 supply the inputs to Or circuit 179. The juncture 180 connected to receive the output of Or circuit 179 is therefore Up when either the juncture 178 or the terminal 15–2 is Up or when the sum is either 0–9, 10, 11, 14, 15, 18 or 19. The juncture 180 supplies the input to inverter 181 and its output lead 182 is therefore Up when its input is Down and vice versa. The lead 182 is therefore Up when the sum is either 12, 13, 16 or 17. The juncture 178 and the terminal 15–2 supply the two inputs to the And circuit 183a and the output lead 184 of And circuit 183a is Up only when both of its inputs are Up or when the sum is either 2, 3, 6 or 7. Leads 182 and 184 supply the inputs to Or circuit 185. The output of Or circuit 185 is applied to terminal 20–2 which is Up when either of the leads 182 and 184 is Up or when the sum is either 2, 3, 6, 7, 12, 13, 16 or 17. Juncture 180 and terminal 15–4 supply the inputs for the Or circuit 187 and the And circuit 188a. The output lead 189 connected to Or circuit 187 is therefore Up when either juncture 180 or terminal 15–4 is Up or when the sum is either 0–15, 18 or 19. Lead 189 supplies the input to inverter 190 whose output lead 191 is Up when its input is Down or when the sum is either 16 or 17. The output lead 192 connected to And circuit 188a is Up only when both the input terminal 15–4 and juncture 180 are Up or when the sum is either 4, 5, 6, 7, 14 or 15. Leads 191 and 192 supply the inputs to Or circuit 193. The output terminal 21–4 connected to the output of Or circuit 193 is therefore Up when either one of the leads 191 or 192 is Up or when the sum is either 4, 5, 6, 7, 14, 15, 16 or 17. Input terminal 15–8 and juncture 178 supply the inputs to And circuit 195a whose output lead 196 is Up only when the terminal 15–8 and the juncture 178 are Up or when the sum is 8 or 9. The inputs to And circuit 197a are supplied by the input terminals 15–2 and 16–8 and its output lead 198 is Up only when both those terminals are Up or when the sum is either 18 or 19. Leads 196 and 198 supply the inputs for Or circuit 199. The output terminal 22–8 connected to Or circuit 199 is therefore Up when either of the leads 196 or 198 is Up or when the sum is 8, 9, 18 or 19.

The output terminals 15–1 (Fig. 1), 20–2, 21–4, 22–8 and 23–10 supply an output representing the sum in the binary-decimal system of the two decimal digits applied in the binary notation to inputs 11 and 12 (Fig. 1). This is readily seen by reference to the right-hand column of Table I. The right or first binary column thereof appears at terminal 15–1 (Fig. 1) as a result of the normal binary addition effected in the 1 bit adder 15 (Fig. 1). The second binary column from the right shows a binary 1 is present when the decimal sum is 2, 3, 6, 7, 12, 13, 16 or 17. Such is in correspondence with the Up condition of terminal 20–2. Similarly, the third, fourth and fifth binary columns correspond with the Up condition of terminals 20–4, 22–8 and 23–10 respectively and indicate that the output produced at the terminals 15–1, 20–2, 21–4, 22–8 and 23–10 is in the binary-decimal system.

Figure 6A:
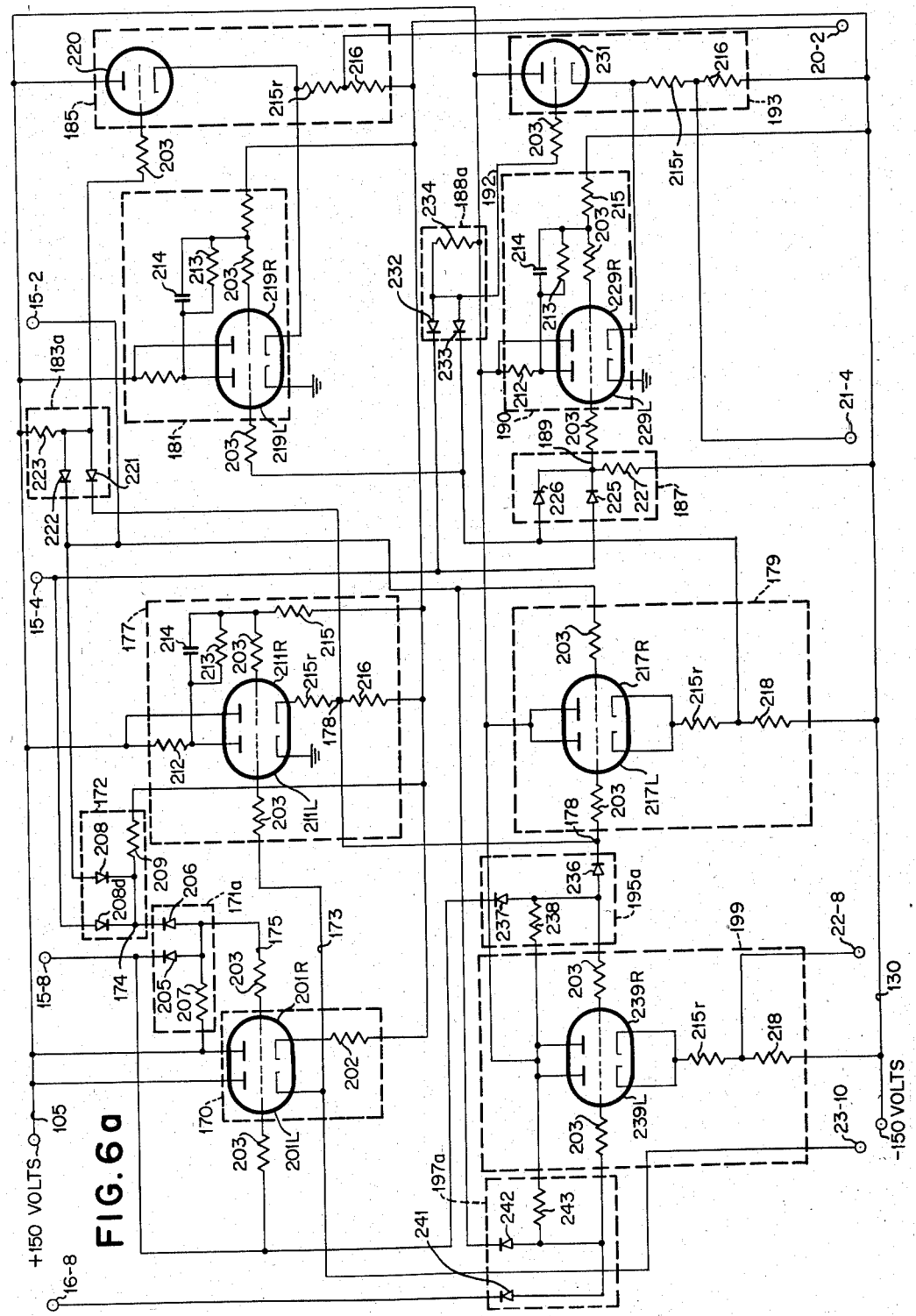
Fig. 6a is a circuit diagram corresponding to the logical diagram of Fig. 6.

Referring to Fig. 6a the circuit diagram corresponds functionally with the logical diagram shown in Fig. 6.

The operation of the circuit is more readily understandable when considered in connection with Fig. 6 and Table I.

The tubes 201L and 201R have their plates connected to the +150 volt line 105 and their cathodes commonly connected through load resistor 202 to the −150 volt line 130. Parasitic suppressor resistors 203 are connected to the control grid of each tube. These cathode follower tubes comprise Or circuit 170 and when the terminal 16–8 is Up, the output lead 173 is Up thereby denoting the presence of carry. And circuit 171a comprises diode rectifiers 205 and 206 and the pull up resistor 207. When the lead 175 connected to the juncture of diodes 205 and 206 is Up, the output lead 173 is Up, causing the output terminal 23–10 to go Up thereby indicating the presence of carry or a 10 bit. Or circuit 172 comprises the diode rectifiers 208 and 208d and the pull down resistor 209 connected to the −150 volt line 130. The inputs to Or circuit 172 or the plates of the diodes 208d and 208 are connected respectively to input terminals 15–4 and 15–2. Hence, if either a 4 (0100) or a 2 (0010) is present at those respective terminals, the lead 174 connecting the juncture of diodes 208 and 208d to the cathode of diode 206 of And circuit 171a is Up. The cathode of diode 205 is connected to the input terminal 15–8. Hence, the lead 175 connected to the juncture of diodes 205 and 206 of And circuit 171a is Up when an 8 (1000) is present at input terminal 15–8 and a 4 (0100) or a 2 (0010) is present at input terminals 15–4 and 15–2 respectively. All decimal sums between 10–19 inclusive are represented by input terminal 16–8 being in the Up condition, or input terminal 15–8 being in the Up condition simultaneously with input terminal 15–4 or input terminal 15–2 being in the Up condition. It is seen, therefore, that the output terminal 23–10 will be in the Up condition when the decimal sum is over 9 (1001). The inverter (INV) 177 comprises amplifier tube 211L and cathode follower tube 211R. The cathode of tube 211R is connected to ground and its plate is connected through load resistor 212 to the +150 volt line 105 and through resistor 213 and frequency compensating condenser 214, in parallel, to the control grid of tube 211R. Resistor 215 connected to the grid of tube 211R and the −150 volt line 130 with resistors 213 and 212 comprise a voltage divider. The cathode of cathode follower tube 211R is connected through a parasitic suppressor resistor 203 and load resistor 216 to the −150 volt line 130. When the control grid of tube 211R is Up, its plate is Down, the control grid of cathode follower tube 211R is Down and the cathode of tube 211R is Down. Hence, when the control grid of the tube 211L is Up, the cathode of tube 211R is Down and vice versa. It, therefore, follows that the cathode of tube 211R and juncture 178 are Up when the decimal sum is between 0–9 inclusive.

The Or circuit 179 comprises cathode follower tubes 217L and 217R having their plates commonly connected to the +150 volt line 105 and their cathodes commonly connected through parasitic suppressor resistor 203 and load resistor 218 to the −150 volt line 130. The control grid of the tube 217L is connected to the cathode of tube 211R and the control grid of the tube 217R is connected to the input terminal 15–2. The control grids of tubes 217L and 217R and their commonly connected cathodes are, therefore, Up when either the cathode of tube 211R or the terminal 15–2 is Up. The inverter circuit 181 comprising tubes 219L and 219R is similar to inverter circuit 177. However, the cathode circuit of tube 219R is included as part of Or circuit 185 which also includes tube 220 having its plate connected to the +150 volt line 105, its cathode connected to the cathode of tube 219R and its control grid connected to the plate of diode rectifier 221. The cathode of inverter circuit 181 is Up when the Or circuit 179 is Up and is therefore Up when the sum is either 12, 13, 16 or 17. This cathode is connected to the output terminal 20-2. And circuit 183a comprises diode rectifiers 221 and 222 having their cathodes connected respectively to the cathode of tube 211R and the input terminal 15-2 and the pull up resistor 223 commonly connected to the plates to diode rectifiers 221 and 222 and to the +150 volt line 105. The cathode of tube 211R and the input terminal 15-2 are Up only when the sum is either 2, 3, 6 or 7. Consequently, the cathode of tube 220 and of tube 219R and the output terminal 20-2 are also Up when the sum is 2, 3, 6 or 7. Or circuit 187 comprises the diode rectifiers 225 and 226 having their plates connected respectively to the input terminal 15-4 and the output of Or circuit 179, and the pull down resistor 227 connected from the juncture of the cathodes of diode rectifiers 225 and 226 to the −150 volt line 130. Inverter 190 comprising the tubes 229L and 229R is similar to the inverters 177 and 181. The cathode circuit of tube 229R is included as part of the Or circuit 193 and is connected to the cathode of tube 231 having its control grid connected to the plate of diode rectifiers 232 and 233 and its plate connected to the +150 volt line 105. The output of Or circuit 187 is Up when the sum is either 0-15, 18 or 19. The cathode of tube 229R and output terminal 21-4 connected thereto are therefore Up when the sum is either 16 or 17.

And circuit 188a comprises diode rectifiers 232 and 233 having their cathodes connected to the input terminal 15-4 and the output of Or circuit 179 respectively, and pull up resistor 234 connected between the +150 volt line 105 and the juncture of the commonly connected plates of diode rectifiers 232 and 233. The lead 192 connected to the output of And circuit 188a is Up only when the input terminal 15-4 is Up and the output of Or circuit 179 is Up. The cathodes of tubes 231 and 229R and the output terminal 21-4 are Up when the lead 192 is Up or when the sum is either 4, 5, 6, 7, 14 or 15. And circuit 195a comprises diode rectifiers 236 and 237 having their cathodes connected respectively to the cathode of tube 211R and the input terminal 15-8, and pull up resistor 238 connected between the +150 volt line 105 and the juncture of the commonly connected plates of diode rectifiers 236 and 237. Or circuit 199 is similar to Or circuit 179 and comprises the tubes 239L and 239R. The control grid of tube 239R is connected to the juncture of the plates of diode rectifiers 236 and 237. When the cathode circuit of tube 211R is Up and the input terminal 15-8 is Up, the control grid of tube 239R, cathode circuit of tube 239R and the output of terminal 22-8 are Up, i.e., when the sum is either 8 or 9. And circuit 197a comprises diode rectifiers 241 and 242 having their plates connected respectively to the input terminal 16-8 and the input terminal 15-2, and pull up resistor 243 connected between the +150 volt line 105 and the plates of diode rectifiers 241 and 242. The juncture of the plates of diodes 241 and 242 is also connected to the control grid of tube 239L. Hence, when the input terminals 16-8 and 15-2 are Up, the control grid of tube 239L is Up, and the cathode circuit of tube 239L is Up and the terminal 22-8 connected thereto is also Up, i.e., when the sum is either 18 or 19.

Figure 7A:
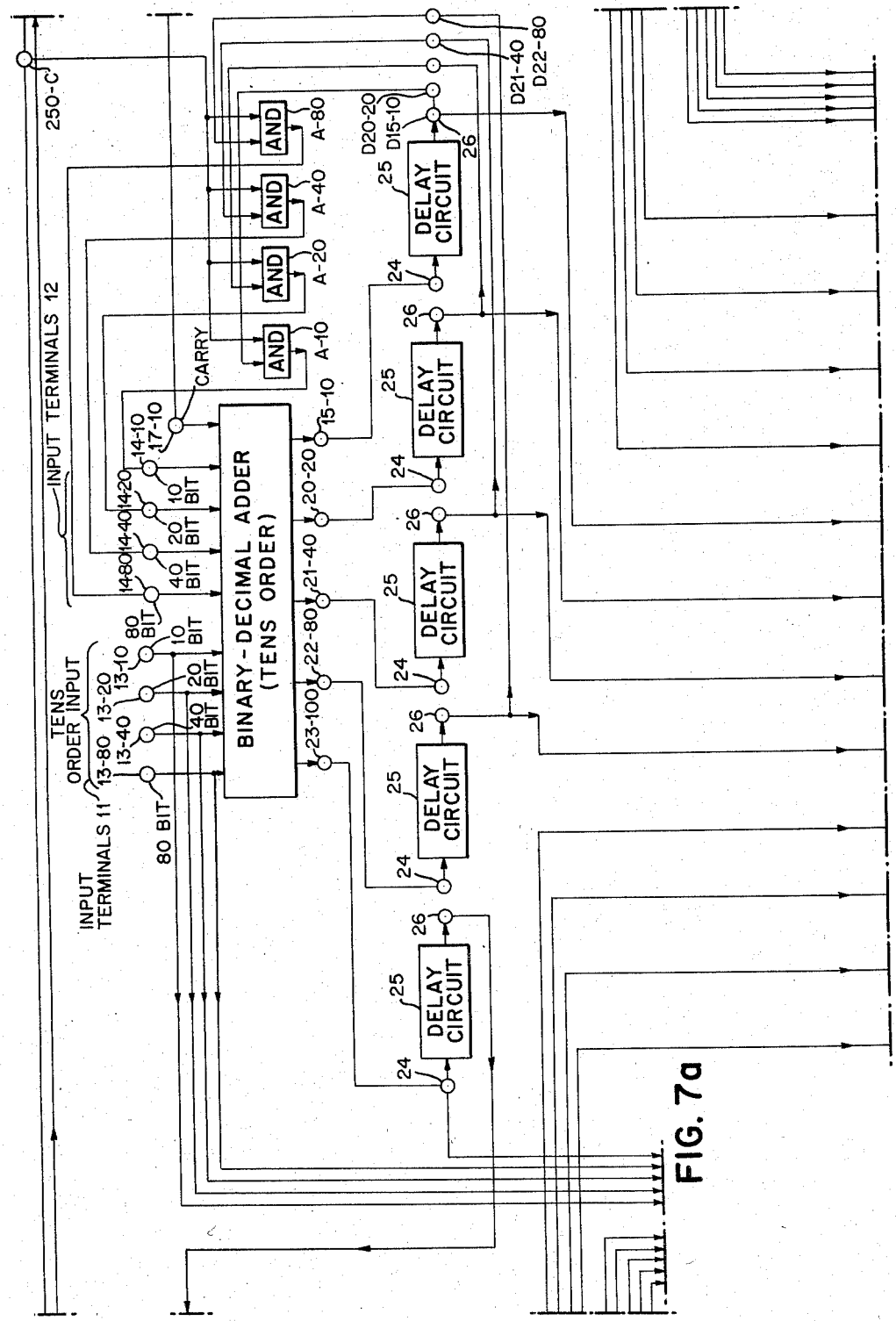
Figure 7B:
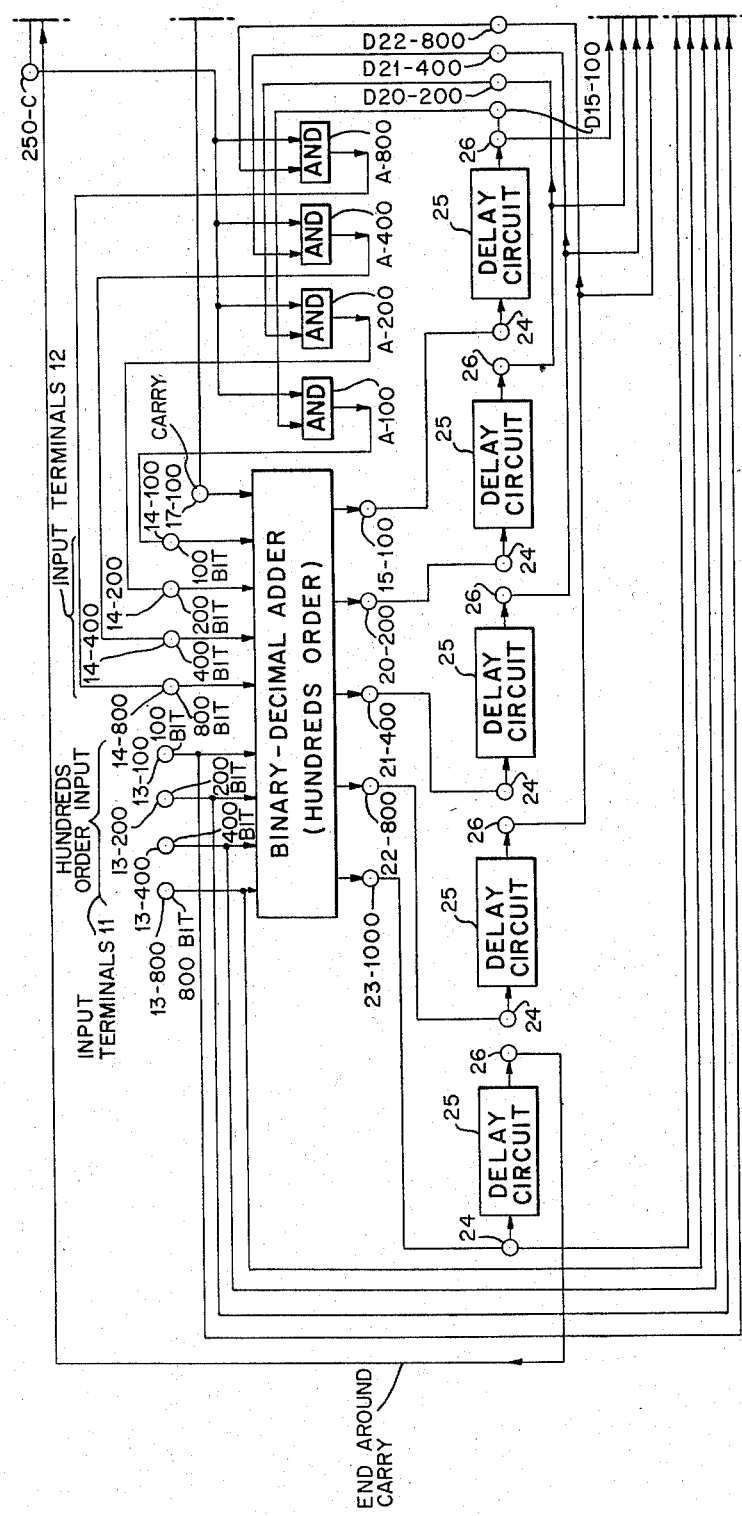
Figure 7C:
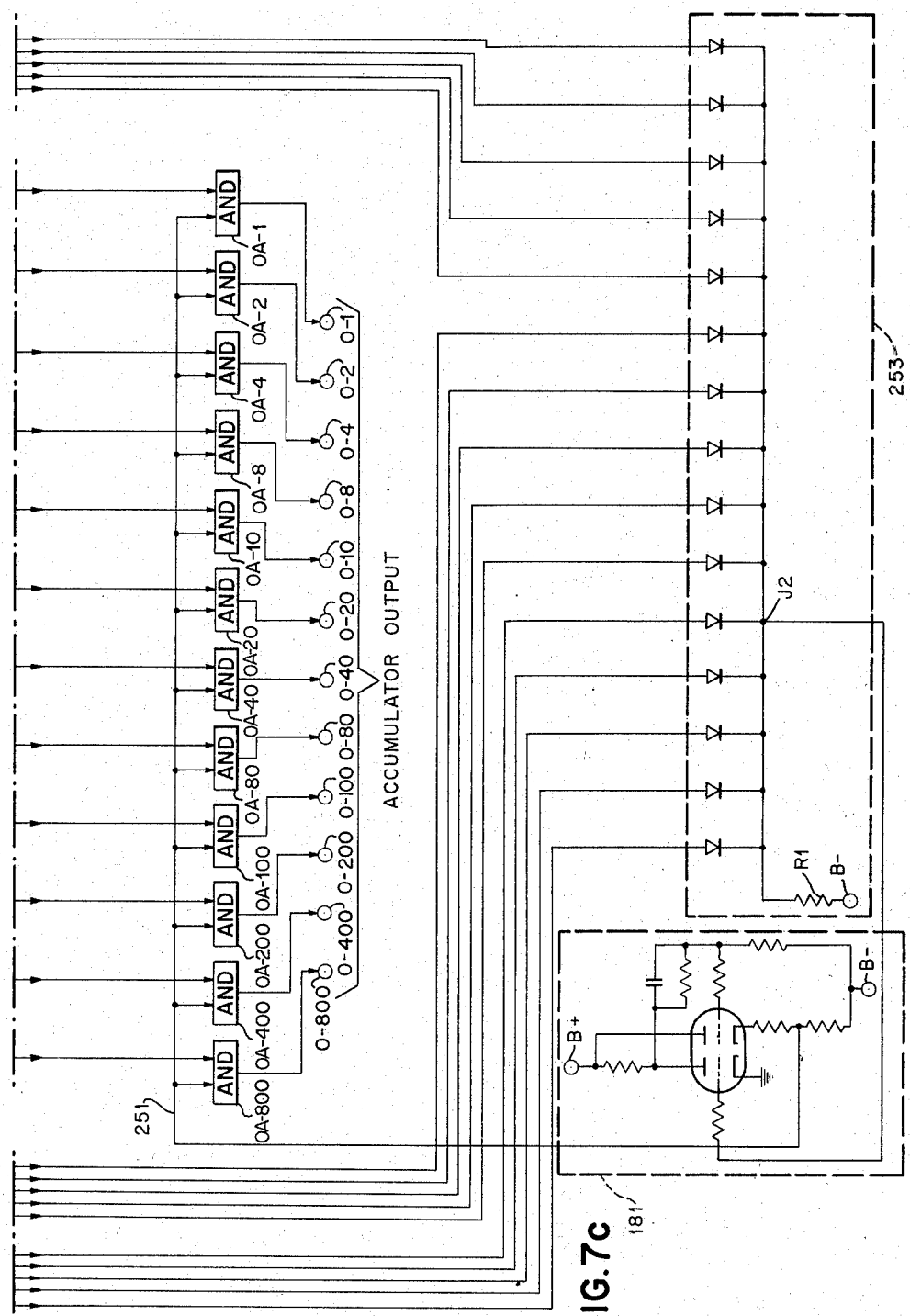

Figs. 7, 7a, 7b and 7c arranged as shown in Fig. 7d show three orders of the novel accumulator; the units order is shown in Fig. 7, the tens order in Fig. 7a, and the hundreds order in Fig. 7b. Circuitry for indicating the amount standing in the accumulator immediately after input and carry ceases is shown in Fig. 7c. The decimal digits of the number to be stored in the accumulator is applied in the binary-decimal system to the input terminals 11 of the corresponding accumulator order.

Each order of the accumulator employs a binary-decimal adder. Each output terminal of the adder is connected through a delay circuit 25 (see Figs. 7, 7a, 7b) and an And circuit to the corresponding bit terminal of the input terminals 12 thereof. For example, the output terminal 20-2 (Fig. 7) is connected through delay circuit 25 to a terminal D20-2. Terminal D20-2 is connected to one input of the two-input And circuit A-2 having its output terminal connected to the 2-bit terminal 14-2 of the input terminals 12. Each of these And circuits is designated by an A- followed by a number representing the decimal value of the bit transferred through that And circuit. The other input terminal of each of these And circuits A-1, A-2, A-4, A-10, A-20, A-40, A-80, A-100, A-200, A-400 and A-800 is commonly connected to a terminal 250-C which is normally in the Up condition. Hence, when a binary 1 is present at any one of the output terminals 15-1, 20-2, 21-4, 22-8, 15-10, 20-20, 21-40, 22-80, 15-100, 20-200, 21-400 or 22-800, the second input of the And circuit connected to that output terminal is in the Up condition and the output terminal of that And circuit is Up. A binary 1 is therefore applied to the bit terminal connected to the output of this And circuit.

It is seen from the above that when an amount is stored in any accumulator order it is continuously circulated through a circuit comprising the output terminals of the binary-decimal adder which indicate that amount, the delay circuits connected thereto, and the above designated And circuits connected to the outputs of those delay circuits, the bit terminals of the input terminals 12 connected to the output of those And circuits, and the binary decimal adder itself. Hence, if an amount exhibits itself at the output of a binary-decimal adder during one given time interval, it is applied to the input terminals 12 thereof during the next subsequent time interval.

If it is desired to clear the accumulator, i.e., remove all amounts stored therefrom, a negative clear pulse is applied to terminal 250-C (Fig. 7) to cause the input terminal of the And circuits connected thereto to go Down. Hence, when the other input terminal of these And circuits goes Up in response to the circulation of the amount stored as above described, it will have no effect at the output of that And circuit, since both inputs of the And circuit must be Up simultaneously for the And circuit to provide an output.

The carry output terminal 23-10 (Fig. 7) is connected through a delay circuit 25 to the 10 bit carry input terminal 17-10 (Fig. 7a) and the carry output terminal 23-100 (Fig. 7a) is connected through a delay circuit 25 to the 100 bit carry input terminal 17-100 (Fig. 7b). The carry output terminal 23-1000 is connected through a delay circuit 25 to the one bit carry input terminal 17-1 (Fig. 7). This circuit is utilized only when subtraction is performed in response to the entry of nine complements to the input terminals of the accumulator order.

Obviously if a 10 bit appears at terminal 23-10 during one time interval, it is transferred through the corresponding delay circuit to the 10 bit carry input terminal 17-10 and applied thereto during the next subsequent time interval. Carry from the tens order to the hundreds order is likewise effected by the transfer of the 100 bit or carry pulse from the carry output terminal 23-100 to the 100 bit carry input terminal 17-100. One input of each of the And circuits (Fig. 7c) 0A-1, 0A-2, 0A-4, 0A-8, 0A-10, 0A-20, 0A-40, 0A-80, 0A-100, 0A-200, 0A-400, 0A-800 is connected to the respective terminals D15-1, D20-2, D21-4, D22-8, D15-10, D20-20, D21-40, D22-80, D15-100, D20-200, D21-400 and D22-800. The other input terminals of the above listed And circuits are commonly connected to a lead 251 connected to the output of inverter circuit 181 (Fig. 7c).

Each of the input terminals 11 of each order of the accumulator, and the carry output terminals 23-10, 23-100, and 23-1000 is connected to the plate of a different one of the diode rectifiers of the fifteen-input Or circuit 253. The cathodes of each of the diode rectifiers of Or circuit 253 is connected to a common juncture J2 which is connected to the control grid of tube 219L of inverter 181 to provide the input to the inverter circuit 181. From these connections it is appreciated that if an input is applied to at least one of the input terminals 11 or if a carry output is present in the accumulator, the juncture J2 will be Up. The lead 251 which transfers the output from inverter 181 will therefore be Down. The output or 0A And circuits 0A-1, 0A-2, 0A-4, 0A-8, 0A-10, 0A-20, 0A-40, 0A-80, 0A-100, 0A-200, 0A-400 and 0A-800 will therefore be Down because the commonly connected input terminals of these And circuits is Down. The accumulator output terminals are therefore Down whenever an input is applied to the accumulator or a carry is present in the accumulator.

If no input is provided to the accumulator during a given time interval and no carry output is present during that time interval, the inputs or plates of the diode rectifiers of Or circuit 253 will all be Down and the juncture J2 will therefore be Down. The control grid of tube 219L of inverter 181 goes Down, the plate of tube 219L goes Up and the control grid of 219R goes Up and the cathode of tube 219R goes Up. This causes the lead 251 and the commonly connected inputs of the output And circuits to go Up. Since the other input terminals of these output And circuits are connected into the circuit through which the amount stored in the acculator is circulated the other input terminal of the output And circuits is placed in the Up or Down condition in accordance with the amount stored in the accumulator. The accumulator output terminals 0-1, 0-2, 0-4, 0-8, 0-10, 0-20, 0-40, 0-80, 0-100, 0-200, 0-400 and 0-800 therefore indicate during the time interval next subsequent to the initial absence of an input to the accumulator and the absence of a carry output in the accumulator, the amount stored therein in the binary-decimal system.

The actual operation of the accumulator will be described with reference to a particular example and conjoint reference to Figs. 7, 7a, 7b, 7c and Table II below.

*Table II*

|  | Hundreds Order | Tens Order | Units Order |
|---|---|---|---|
| 764 (stored) | 0111 | 0110 | 0100 |
| 156 (to be added) | 0001 | 0101 | 0110 |
| binary sum | 1000 | 1011 | 1010 |
| binary-decimal sum at carry time | 1000 | 10001 | 10000 |
| binary-decimal sum when carry applied | 1000 | 0001 | 0000 |
| carry | 1 | 1 |  |
| binary-decimal sum (920) | 1001 | 0010 | 0000 |

Assume the amount stored in the accumulator is 764 and the amount to be added thereto is 156. The accumulator, therefore, stands at 011101100100. This binary-decimal input representing 764 is applied to the input terminals 12 at the same time that 156 is applied in binary-decimal form to the input terminals 11 of the accumulator.

It is seen that the 4 bit terminal 14-4, the 20 bit terminal 14-20, the 40 bit terminal 14-40, the 100 bit terminal 14-100, the 200 bit terminal 14-200 and the 400 bit terminal 14-400 are Up and the remaining terminals of the input terminals 12 of the units, tens and hundreds order are Down. Hence, 764, the amount stored in the accumulator, is applied to the input terminals 12 thereof. At this time the addition of 156 causes the 2 bit terminal 13-2, the 4 bit terminal 13-4, the 10 bit terminal 13-10, the 40 bit terminal 13-40, and the 100 bit terminal 13-100 to be Up. The remaining terminals of input terminals 11 of the units, tens, and hundreds order are Down.

These two inputs in binary-decimal form are added by the binary-decimal adders of the units, tens and hundreds orders to produce a binary sum in the manner explained above and indicated in Table II. It is seen from inspection of this binary sum in Table II that it represents more than 9 in the units order and in the tens order. The rationalizer must therefore convert the sum in the units and tens order to the binary-decimal system. The hundreds order is in proper form since a decimal digit of 8 (not over 9) is indicated in the true binary notation. The above conversion is effected by the rationalizer of the units and tens order to produce the binary-decimal sum at carry time as indicated in Table II. At this time the units order stands at 10, the tens order at 110 and the hundreds order at 800. The following terminals are, therefore, Up; carry output terminal 23-10, output terminal 15-10, carry output terminal 23-100, and output terminal 22-800; the remaining output terminals are Down. Carry is, therefore, applied from the terminal 23-10 through delay circuit 25 connected thereto to the carry input terminal 17-10 and from the terminal 23-100 through the delay circuit 25 to the carry input terminal 17-100. During this same time interval a pulse is transferred from the output terminal 15-10 through the delay circuit 25 connected thereto and And circuit A-10 to the 10 bit input terminal 14-10 and from the output terminal 22-100 through the delay circuit 25 connected thereto and And circuit A-800 to the input terminal 14-800. Hence, input terminals 14-10, carry input terminal 17-10, input terminal 14-800 and carry input terminal 17-100 are simultaneously in the Up condition. These amounts are added in the usual manner by the binary-decimal adders to produce the binary-decimal sum shown in Table II above. It is seen that the amount standing in the accumulator now represents the decimal number 920 expressed in the binary-decimal system.

It is seen that the effecting of carry and the subsequent addition of the carry into the proper accumulator orders required one additional time interval in the example shown. If the addition of these carries into the orders to which they were applied would have produced a sum greater than 9, another carry would have been produced thereby. In actual operation in an accumulator using many orders and effecting storage of random numbers, this ripple carry or carry on a carry operation may be a common occurrence. It is, therefore, advantageous to know when the accumulating operation is complete and to then have the amount stored instantaneously available. Such is provided by the circuitry described above and this amount is exhibited at the accumulator output terminals (Fig. 7c). Hence, the accumulator output terminals 0-800, 0-100 and 0-20 are Up.

If it is desired to subtract a number from the amount stored in the accumulator, the end-around carry connection from the carry output terminal 23-1000 (Fig. 7B) through the delay circuit 25 connected thereto and to the carry input terminal 17-1 (Fig. 7) is utilized. Assume the amount standing in the accumulator is again 764 and that 156 is to be subtracted therefrom. To effect such subtraction, the number to be subtracted is entered in the accumulator in nine's complement form. Hence, 843 is entered in the accumulator to provide a sum of 607 plus an end-around carry or 608. This is explained more fully in connection with Table III below.

Table III

|  | Hundreds Order | Tens Order | Units Order |
|---|---|---|---|
| 764 (stored) | 0111 | 0110 | 0100 |
| 156 (to be subtracted) or 843 (to be added) | 1000 | 0100 | 0011 |
| binary sum | 1111 | 1010 | 0111 |
| binary-decimal sum at carry time | 10101 | 10000 | 0111 |
| binary-decimal sum when carry applied | 0101 | 0000 | 0111 |
| carry | 1 |  | 1 |
| final binary-decimal sum (remainder 608) | 0110 | 0000 | 1000 |

When the binary-decimal representation of 764 is present at the input terminals 12 of the accumulator, 843 is applied in binary-decimal form to the input terminals 11; i.e., terminals 13-1, 13-2, 13-40, and 13-800 are Up; the remaining input terminals having the prefix 13 are Down. The binary sum obtained by the binary addition indicates that 7 is present in the units order, 100 in the tens order and 1500 in the hundreds order. Hence, the rationalizer must convert the amount stored in the tens and hundreds order to the binary-decimal system and therefore at carry time a carry pulse is present at the carry output terminals of the tens and hundreds order. The carry at the tens carry output terminal 23-100 is applied during the next succeeding time interval to the carry input terminal 17-10 of the hundreds order and the carry at the carry output terminal 23-100 is applied in end-around fashion to the 1 bit carry input terminal 17-1 of the units order. This carry pulse is transferred from terminal 23-1000 through the delay circuit 25 (Fig. 7b) connected thereto to the terminal 17-1 connected to the output terminal 26 of the delay circuit. When these carry input terminals 17-1 and 17-100 are Up, the input terminals 12-1, 13-2, 13-4, 13-100 and 13-400 are also Up. The carries are, therefore, added during this next time interval to the binary-decimal sum stored in the respective orders of the accumulator to produce the final binary-decimal sum, corresponding to the complement number 608. Hence, during the next time interval the accumulator output terminals 0-8, 0-200 and 0-800 are Up indicating the correct sum or the remainder of 608 in true binary-decimal form.

A subtraction operation will now be described which changes the sign of the balance standing in the accumulator from positive to negative. It is assumed, as before, that 764 is standing in the accumulator and that 800 is to be subtracted therefrom. The exact operation effected is indicated in Table IV below.

Table IV

|  | Hundreds | Tens | Units |
|---|---|---|---|
| 764—stored | 0111 | 0110 | 0100 |
| 800—to be subtracted or 199—to be added | 0001 | 1001 | 1001 |
| binary sum | 1000 | 1111 | 1101 |
| binary-decimal sum at carry time | 1000 | 10101 | 10011 |
| binary-decimal sum when carry applied | 1000 | 0101 | 0011 |
| carry |  | 1 | 1 |
| binary-decimal sum—negative balance in complement form | 1001 | 0110 | 0011 |

Since 800 is to be subtracted, the nine's complement thereof or 199 is entered in binary-decimal form at the input terminals 11. In accordance with the above description, the binary-decimal sum at carry time is obtained in the exact manner described above. This sum indicates carry from the units to the tens order and from the tens to the hundreds order.

During the next subsequent time interval these carries are applied to cause the carry input terminals 17-10 and 17-100 to go Up. Simultaneously therewith, the input terminals 14-1, 14-2, 14-10, 14-40 and 14-800 go Up and addition is effected in the respective accumulator orders to produce the binary-decimal sum which represents the negative balance in complement form. During the time interval following this addition, this sum is indicated at the accumulator output terminals by terminals 0-1, 0-2, 0-20, 0-40, 0-100 and 0-800 going Up. Such indicates that the nine's complement of the negative value is 963. Also, it is seen that 963 represents the nine's complement of the true negative remainder 36.

The above subtraction operation caused the amount stored in the accumulator to change from a positive value to a negative value. Such a change is always indicated by the absence of end-around carry or the absence of a carry input at the 1 bit carry terminal 17-1. The mere fact that a 9 is present in the highest accumulator order does not mean that the balance is negative. For example, suppose that 872 is to be subtracted from 563. In this example 563 is added to the nine's complement of 872 or to 127 to produce a sum of 690 which represents the negative remainder 309 in nine's complement form. A 6 is, therefore, present in the hundreds order of the accumulator.

If the amount stored or balance in the accumulator is in complement form and a further subtraction is effected, the absence of end-around carry indicates that the storage capacity of the accumulator has been exceeded. Now, suppose the complement value stored in the accumulator is again 690 and 700 is to be subtracted therefrom. The nine's complement of 700 or 299 is entered into the accumulator and added to 690 to provide a sum of 989. No end-around carry occurs. The correct negative balance is 309 plus 700 or 1009 which exceeds the storage capacity of the accumulator.

Briefly, when negative amounts are added to positive amounts, the absence of end-around carry indicates a negative balance and when negative amounts are added to negative balances the presence of end-around carry indicates a negative balance.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a parallel accumulator including a binary-decimal adder for each decimal order of the accumulator, each said adder having first and second terminal groups for receiving manifestations to be added, a carry output terminal, a carry input terminal, and a third terminal group for manifesting a sum in the binary-decimal system; first delay circuit means coupling the carry output terminal of the adder for each order to the carry input terminal of the adder for the next higher order; and a storage circuit comprising a delay circuit connected between each terminal of said third terminal group and a corresponding terminal of said second terminal group.

2. The invention set forth in claim 1 including a multi-input electronic switch having one output terminal and a connection from each terminal of said first terminal groups of the accumulator and from the carry output terminal of each order of the accumulator to an input of said multi-input switch; an inverter circuit having an input terminal connected to the output terminal of said multi-input switch; a first two-input electronic switch for each terminal of said third terminal groups and having one input connected thereto; and a connection from the output of said inverter circuit to the other input of the first two-input electronic switches to operate said first two-input switches to manifest the value stored in said accumulator when all carry input and first terminal group input manifestations cease.

3. The invention set forth in claim 1 wherein each of said storage circuits includes a two-input electronic switch interposed therein and having its output connected to the associated terminal of said second terminal group and one input connected to the output of the associated delay circuit; and a common connection from the other input of said two-input switches to a terminal for receiving an electrical manifestation to disable said storage circuit.

4. The invention set forth in claim 3 including a multi-input electronic switch having one output terminal and a connection from each terminal of said first terminal group of the accumulator and from the carry output terminal of each order of the accumulator to an input of said multi-input switch; and coincidence circuit means connected to be responsive to said storage circuit and the absence of an output from said multi-input switch representing the absence of an input to the accumulator, to manifest the value stored in the accumulator.

5. The invention set forth in claim 3 including pulse transfer means having inputs connected to the terminals of said first terminal group and the carry output from each accumulator order to provide an output when a pre-selected input manifestation is present thereat; and coincidence circuit means connected to be responsive to an output from said pulse transfer means and an input to the terminals of said second terminal group to manifest the value stored in the accumulator.

6. In a parallel accumulator wherein decimal digits are added serially in time by the summation of binary bits; a binary-decimal adder having, output and carry output terminals and at least a first group of input terminals for each accumulator decimal order for receiving binary bits to be stored and supplying an output in the binary-decimal system; and circuit means connected to said input and carry terminals for determining the presence or absence of input and carry at the respective terminals.

7. The invention set forth in claim 6 including a coincidence circuit having an input connected to the output of said circuit means and an input connected to each of said output terminals to indicate the amount stored in said accumulator when said input and said carry are absent.

8. The invention set forth in claim 6 including a second group of input terminals, and delay circuit means and switching means connected in series between said output terminals and said second group of input terminals of each binary-decimal adder said delay means and said switching means and each associated adders comprising a circulatory storage circuit traversed by pulses indicative of the amount stored therein during a time interval determined by said delay circuit means; and storage clearing circuit means connected to operate said switching means and operable in response to a clearing pulse to interrupt said storage circuit and thereby clear said storage circuit of the amount stored therein.

9. A parallel accumulator for effecting storage within a certain given time interval including a binary-decimal adder for each decimal order of the accumulator, each of said adders having a first and a second input terminal group for simultaneously receiving binary bit inputs to be added, a carry output terminal, a carry input terminal, and a third terminal group for manifesting an output as a sum in the binary-decimal system; a connection between the carry output terminal of each order and the carry input terminal of the next higher order for transferring a carry pulse to that higher order within a given time interval; pulse delay means providing a time delay between its output and input equal to said given time interval; switching circuit means connected in series with said pulse delay means between each terminal of said third terminal group and a different and corresponding terminal of said second terminal group for applying the output of that binary-decimal adder to its input to thereby maintain continuous circulation of said sum, said sum being circulated through said adder once during each of said given time intervals; and a common connection between all of said switching circuit means for receiving an electrical pulse to interrupt circulation of said sum and thereby clear said accumulator of all values stored therein.

10. A parallel accumulator for effecting storage within a certain given time interval including a binary-decimal adder for each decimal order of the accumulator, each of said adders having first and second input terminal groups for simultaneously receiving binary bit inputs to be added, a carry output terminal, and a third terminal group for manifesting an output as a sum in the binary-decimal system; a connection between the carry output terminal of each order and the carry input terminal of the next higher order for transferring a carry pulse to that higher order within a given time interval; pulse delay means providing a time delay between its output and input equal to said given time interval; switching circuit means connected in series with said pulse delay means between each terminal of said third terminal group and a different and corresponding terminal of said second terminal group for applying the output of that binary-decimal adder to its input to thereby maintain continuous circulation of manifestations of said sum, said sum being circulated through said adder once during each of said given time intervals; a common connection between all of said switching circuit means for receiving an electrical pulse to interrupt circulation of manifestations of said sum and thereby clear said accumulator of all values stored therein; circuit means having its input connected to all the terminals of said first terminal group and to all said carry output terminals and energizable by the presence of a binary bit at one or more of said terminals to produce an output; and an inverter circuit connected to the output of said circuit means to provide an output when the absence of a binary bit is indicated by said circuit means.

11. A parallel accumulator for effecting storage within a certain given time interval including a binary-decimal adder for each decimal order of the accumulator, each of said adders having a first and a second input terminal group for simultaneously receiving binary bit inputs to be added, a carry output terminal, and a third terminal group for manifesting an output as a sum in the binary-decimal system; a connection between the carry output terminal of each order and the carry input terminal of the next higher order for transferring a carry pulse to that higher order within a given time interval; pulse delay means providing a time delay between its output and input equal to said given time interval; switching circuit means serially connected with said pulse delay means between each terminal of said third terminal group and a different and corresponding terminal of said second terminal group for applying the output of that binary-decimal adder to its input to thereby maintain continuous circulation of said sum, said sum being circulated through said adder once during each of said given time intervals; a common connection between all of said switching circuit means for receiving an electrical pulse to interrupt circulation of said sum and thereby clear said accumulator of all values stored therein; circuit means having its input connected to all the terminals of said first terminal group and to all said carry output terminals and energizable by the presence of a binary bit at one or more of said terminals to produce an output; an inverter circuit connected to receive the output of said last named circuit means to provide an output when the absence of a binary bit is indicated by said circuit means; and coincidence circuit means for indicating the amount stored in said accumulator during the time interval when said absence of a binary bit is indicated; said coincidence circuit means including connections from the output of each of said pulse delay means to the input of said coincidence circuit means, and four output terminals for each order of the accumulator.

(References on following page)

References Cited in the file of this patent

UNITED STATES PATENTS

| | | |
|---|---|---|
| 2,705,108 | Stone | Mar. 29, 1955 |

FOREIGN PATENTS

| | | |
|---|---|---|
| 750,475 | Great Britain | June 13, 1956 |

OTHER REFERENCES

"Synthesis of Electronic Computing and Control Circuits," Harvard Press, May 17, 1951, pages 187 to 194.